United States Patent [19]

West et al.

[11] Patent Number: 5,550,575

[45] Date of Patent: Aug. 27, 1996

[54] VIEWER DISCRETION TELEVISION PROGRAM CONTROL SYSTEM

[76] Inventors: Brett West, Two Lookout Point Rd., Ridgefield, Conn. 06877; John P. Gardner, 1214 Wood La., Arlington, Tex. 76017

[21] Appl. No.: 237,658

[22] Filed: May 4, 1994

[51] Int. Cl.⁶ ............................................. H04N 7/167
[52] U.S. Cl. ................................... 348/5.5; 380/20
[58] Field of Search ............................. 348/5.5, 3, 4, 5; 380/20, 5

[56] References Cited

U.S. PATENT DOCUMENTS

| | | |
|---|---|---|
| 4,348,696 | 9/1982 | Beier . |
| 4,536,791 | 8/1985 | Campbell et al. . |
| 4,685,131 | 8/1987 | Horne . |
| 4,718,107 | 1/1988 | Hayes . |
| 4,750,213 | 6/1988 | Novak . |
| 4,751,578 | 6/1988 | Reiter et al. . |
| 4,888,796 | 12/1989 | Olivo, Jr. . |
| 4,903,031 | 2/1990 | Yamada . |
| 4,930,158 | 5/1990 | Vogel . |
| 4,930,160 | 5/1990 | Vogel . |
| 5,033,085 | 7/1991 | Rew . |
| 5,060,079 | 10/1991 | Rufus-Isaacs . |
| 5,168,372 | 12/1992 | Sweetser . |
| 5,172,111 | 12/1992 | Olivo, Jr. . |
| 5,270,822 | 12/1993 | Choi . |

*Primary Examiner*—Stephen C. Buczinski
*Attorney, Agent, or Firm*—Harold Levine, Esq, P.C.

[57] ABSTRACT

A viewer discretion television program control system including devices and methods for controlling access to television viewing, especially by children. It includes provision for storing suitability ratings for each program receivable by a television set, allocation of personal identification numbers to each of a plurality of potential viewers (e.g., children), and individual allocations of permissible viewing time and program content, all under the control of a local authority such as a parent or guardian.

27 Claims, 9 Drawing Sheets

5,550,575

VIEWER DISCRETION TELEVISION PROGRAM CONTROL SYSTEM

This invention relates devices and methods for controlling access to television programming, and more particularly, to a comprehensive viewer control system for enabling family level control over access to the content of television viewing and the amount of viewing time for each member of the household.

BACKGROUND OF THE INVENTION

A dilemma for modern television programmers and viewers alike is the problem of viewer diversity and differing moral values. Television programs that seem harmless to one person are considered by another as totally unacceptable and morally wrong. Among the conflicting values are the primary issues of violence, nudity, language and subject matter.

Millions of American households are single parent or two paycheck households where children's television choices cannot be supervised during many hours of each day. The programs these children watch and the amount of time they spend watching the television are of great concern to their parents. Millions of other Americans adhere to moral values that are offended by many current television programs. In addition, many other Americans who are not offended by the current programming, now believe that television programs may be an influential molder of our nation's values and behavior patterns. The strength of this belief has led to cries for government intervention and has even fueled attempts at legislative solutions to television censorship. However, first amendment rights have blocked such efforts.

Problems arise in the nature of television technology. Programs are transmitted from a central location for viewing by millions of people in their own homes. Cable television systems use in-home converters to receive the video and audio signals transmitted on cable. These converters are used to convert the video and audio signals of the channel selected by the viewer to predetermined and fixed frequencies for application to the user's television receiver. Computer generated digital data can also be transmitted, conveying commands to enable or disable the converter or enable or disable the reception of different channels.

A variety of proposals have heretofore been made to address the selective viewing needs of the American family. Most of the proposals have either been limited in their focus or lacked practicability. Thus, for example, a system for obtaining and viewing either separately or as an overview a listing of programs scheduled for presentation has been described in U.S. Pat. No. 4,751,587 which was granted to Reiter et al. on Jun. 14, 1988. In addition to downloading and displaying a listing of programs, it proposed including generalized access control at Column 7, lines 15 et seq. where it is said, "The ROM could also take the form of a PROM or EPROM and be used to permit the owner of the television and system invention to control access to the television, or access to particular television channels. In order to control access, the RAM could instruct the viewer to input a personal code number which would be stored in the ROM and which would act as a password for all future uses of the system and/or television." However, although suggesting a form of general access control, there appears to be no teaching or the utilization of content censorship; and the thrust of the Reiter et al. reference is to aid in searching for user desirable programs rather than censoring undesirable ones.

Some solutions while being technically feasible could not be implemented because they depended on the participation of the organizations whose programs would be censored. Accordingly, in spite of a variety of solutions proposed and patented over many years, effective solutions have yet to be made in the empowering the American family with control over their television viewing.

One approach to providing censorship has been to equip converters with a feature known as "Parental Control." Some "Parental Control" systems employ a key and other a digital pass code to block one or more selected channels from viewing. An example of one such system is that of U.S. Pat. No. 4,718,107 to Hayes. According to the Hayes system, when one or more channels are blocked, all of the programs shown on such channels are made inaccessible by a viewer until the channel is unblocked or until power to the converter is lost. A problem with this approach is that some good or otherwise acceptable programs are blocked along with the unacceptable ones. Thus, a parent wishing to exclude a violent or sexy police program from the view of young children may also be blocking access to his favorite baseball program. Under channel blocking proposals, everything on a channel is either blocked or available for viewing.

The shortcomings of the channel blocking approach have been recognized by others and there have been attempts to devise ways to block individual programs without disabling an entire channel. Some of these approaches incorporate a "Material Content Signal" onto or into program material. Examples of this approach are those of U.S. Pat. Nos. 4,888,796 and 5,172,111 to Olivo, Jr. According to such proposals, a receiving device, upon recognizing the "Material Content Signal", blocks the television program unless a secret code or PIN has been entered into the receiver through a key pad. Other, e.g., those of U.S. Pat. No. 5,033,085 to Rew and U.S. Pat. No. 5,270,822 to Choi, have devised similar methods but have differed in the design of their receiving devices. Each relies on an electronic signal accompanying the broadcast program, such signal being recognized by the receiver which automatically deactivates the television or refuses access to the television channel while the electronic signal is present. While overcoming the all or nothing problem mentioned above, such approaches also have their own shortcomings. First, their solutions are limited: there is but one threshold per television set. For example, in a family with a parent, a very young child, a teenage child and grandparent, all members of the household must adhere to one of two choices: either a censored level geared for one member of the household or access to all programs. An additional problem is created by blocking the signal without informing the viewer why the program is not being received. When the television screen goes blank or the picture is scrambled, is the television malfunctioning or is it blocking a program? The viewer is not informed.

The most significant problem with this approach is that it depends on the networks and cable companies to insert the ratings data into the broadcast signal. Those who are to be censored assign the ratings and control over ratings and viewing in part, at least, is at the judgment of the viewed. Thus, it is the originator of the programs that assigns the ratings, obviously an undesirable condition that might lead to a conflict of interest. Even if ratings are prepared by an impartial third party, effective use of such ratings requires the participation of the broadcasters. If they refuse to insert the program classification signals into the programs, such solution is ineffective. Even if broadcasters cooperate, there lies the problem of establishing uniform and acceptable standards. Thus, what may be an acceptable moral standard to one person may be quite unacceptable to another; and since the foregoing proposals envision a single set of ratings, viewers are limited to a single source standard.

An improved program blocking-censorship approach is described in U.S. Pat. No. 4,930,160 to Vogel. According to the Vogel proposals, program classification signals are encoded in a video or audio portion of received programs, and such approach allows the viewer an expanded array of choices for selecting the types of programming that may be displayed through use of an improved user input provision. During periods of censorship/blocking, alternative viewing material previously selected by the viewer is provided. The user input provisions, while an improvement over other proposals as described above, also suffers from its limitations. While allowing a wider array of classification categories and enhanced censorship selections by the authorized person within the household, such approach limits the viewing options of all viewers to two categories: those who have a PIN and those who don't. Those who do may view all categories of programs, while those who do not are prevented from viewing any. Additionally, the censorship standards utilized under this proposal would likely come from a central censorship authority. This approach also requires the participation of the broadcasters if it is to be effective.

Not only is the matter of television control one of program content but it additionally entails the amount of watching time. Thus, it has been observed that excessive watching time, especially for children, may displace more worthy activities, activities such as school study or physical fitness activity. Here, also, there have been proposals for control. In U.S. Pat. No. 4,566,033 there is proposed a system in which a token is employed to activate a television set for a predetermined period of time. However, such proposals do not distinguish between different users nor do they provide for user identification. In addition, because in the token-operated system operation includes inhibiting power to the television set, it has the additional disadvantage of requiring the reprogramming of any pre-programmed features normally desired for operation.

U.S. Pat. No. 4,348,696 discloses the use of a microprocessor and stored passwords to distinguish between multiple viewers. In addition, it provides for inhibited viewing during selected periods of time during each day. However, it is very complex and suffers from the disadvantage of turning power to the set off and on. It also does not provide for an override capability.

U.S. Pat. No. 5,060,079 discloses an arrangement which utilizes a transportable magnetic medium to activate the television and also provides a readout for viewers so they will know how much time a program has remaining. However, transportable mediums can be exchanged, borrowed or, more likely, lost or misplaced by children. If exchanged, borrowed or altered, children can have access to prohibited programs. On the other hand, if lost, there is no access until another or replacement magnetic medium is provided.

U.S. Pat. No. 5,168,372 to Sweetset describes a time control system which incorporates a viewing allowance that, if exceeded, interrupts the RF input signal. Viewing times can be set on a daily or weekly basis. In addition, the Sweetset system includes block out times for each of a plurality of designees (e.g., children) during any day of the week. Also included is an override feature that allows a parent to watch television regardless of how much time children have remaining, and the system is also capable of channel blocking. However, as with others of the foregoing proposals, such proposals are single dimensional in that they are directed to only one of the two aforementioned facets of effective television watching control. Thus, Sweetset does not control what is seen but only how long it is seen, and the limited channel blocking ability contains the same limitations described above.

Prior art pushbutton based proposals for entering passwords (personal identification numbers generally known as PIN codes) assume that it is easier for a child to press colored buttons than it is for them to enter a four digit number. However, such have certain disadvantages. By the time children reach school age, they are able to count to ten and read numbers. They also have enough dexterity to operate video games. By limiting PIN codes to a sequence of four colored buttons, the possibility of password theft becomes substantial. An older child can either watch a sibling enter his/her password or, through simple experimentation, can ascertain another's PIN number. In addition, because such proposals include assignment of one of four color keys for unit activation, the practical limit of such system is four people. An additional problem with such a password approach is that parents' passwords are programmed using the same four buttons that children use. Because of this limitation, an energetic or motivated child can easily decipher a parent's password and gain control of the television set. Moreover, under these proposals, only one element of information is displayed at a time. If a child wishes to know how much more time is available to him or her during the current period (day or week), he/she must pass through successive displays to locate such information.

An additional disadvantage of the Sweetset proposal is that its programming is cumbersome. Programming prompts are in symbols rather than in written words. To program the unit, one must constantly refer to the accompanying literature, and time allowances can be set either daily or weekly but not in combination. Finally, because the unit is not down line activated, it is not suitably designed to be offered as a cable company service.

As suggested above, none of the foregoing proposals include a comprehensive multi-dimensional solution to television control. Each such proposal addresses one but not both of the considerations of time allocation and program content. However, for many households, both considerations are important.

BRIEF SUMMARY OF THE INVENTION

The present invention overcomes the foregoing problems of the prior art by incorporating both time and content controls within a single system and providing a plurality of censoring authority choices for multiple and variable numbers of viewers within a single household or multiple households. In accomplishing these objectives, the proposals hereof utilize multiple content rating codes generated by many third party rating groups, hereinafter referred to as "Rating Authorities." These Rating Authorities may represent widely divergent moral values.

Content rating codes are gathered into a data base of television listings data containing network and station identifier, program titles, airing start and finish time and censorship ratings and are transmitted from a central ratings collection point to local cable operators where they are temporarily stored. The local operator receive system strips the networks and stations that they do not offer, then replaces the network and station identifiers with the appropriate channel assignment. The content ratings and schedule information are downloaded to the home censorship device at intervals during each day. The content rating codes are stored in a rating data base in memory within each censorship device. Provision is made for a viewer to input the basic censorship time and content guidelines and also for a viewer to customize his supplementary censorship data so that it may be unique to each local household, thus permitting each household to list specific programs or groups of programs that are proscribed. Utilizing PINs for each member of the household, provision is made for utilization of a keypad and nonperishable memory to establish clearly defined times of day, duration and content constraints for the television viewing behaviors of each member of the household. Moreover, provision is made for each PIN holder to be responsible for viewing their permitted choices. The censorship device can be down line activated and deactivated. In addition, a timing clock within the censorship device is updated periodically by a down line signal to ensure proper synchronization of the censorship device real time clock with a single central clock.

The invention hereof also incorporates means for parental programming on an exceptions data base of television programs that the selected rating authority has either censored or not censored. Optional provision for override is provided whereby censored programs which a parent feels are acceptable can be authorized, and uncensored programs which a parent feels are unacceptable can be prohibited. Also included is a Ratings Button which, when pressed, causes a display to appear on the selected show's title, rating, and name of the rating authority assigning the rating.

According to the preferred embodiment, there are multi-tiered levels of censorship, e.g., G, PG, PG-13, R, and X. Users may decide what level of content maturity is permissible for each family member. Also, each family member may be assigned a different level of censorship such as might occur in a family with a 5 year old, a 10 year old and a 17 year old. Moreover, time control is adjustable on a daily basis, provision being made for separate allotment times according to the day of the week. Devices are addressable by local cable operators, thus allowing for the system hereof to be marketed as a premium cable service.

The equipment envisioned hereby may be constructed as a separate controller, built into a cable converter, built into new generation TV controllers, built into a TV, and/or built into a VCR.

The local cable operator may decide which method to deliver the content and program schedule information. They may send it down the VBI of a selected channel, or through other well known means of delivering data through television cable systems. The receiving device (the censoring device) will be configurable to receive the data through any method of delivery.

OBJECTS AND FEATURES OF THE INVENTION

It is one general object of the invention to improve control of television viewing.

It is another object of the invention to improve household control of family member television viewing.

It is yet another object of the invention to increase scope and flexibility of home television censorship.

It is still another object of the invention to improve reliability of home television censorship.

It is yet one other object of the invention to provide both time and content control in one television watching control system.

It is still one additional object of the invention to create a system that may be marketed as a premium cable service.

DETAILED DESCRIPTION OF THE INVENTION

Figure 1:
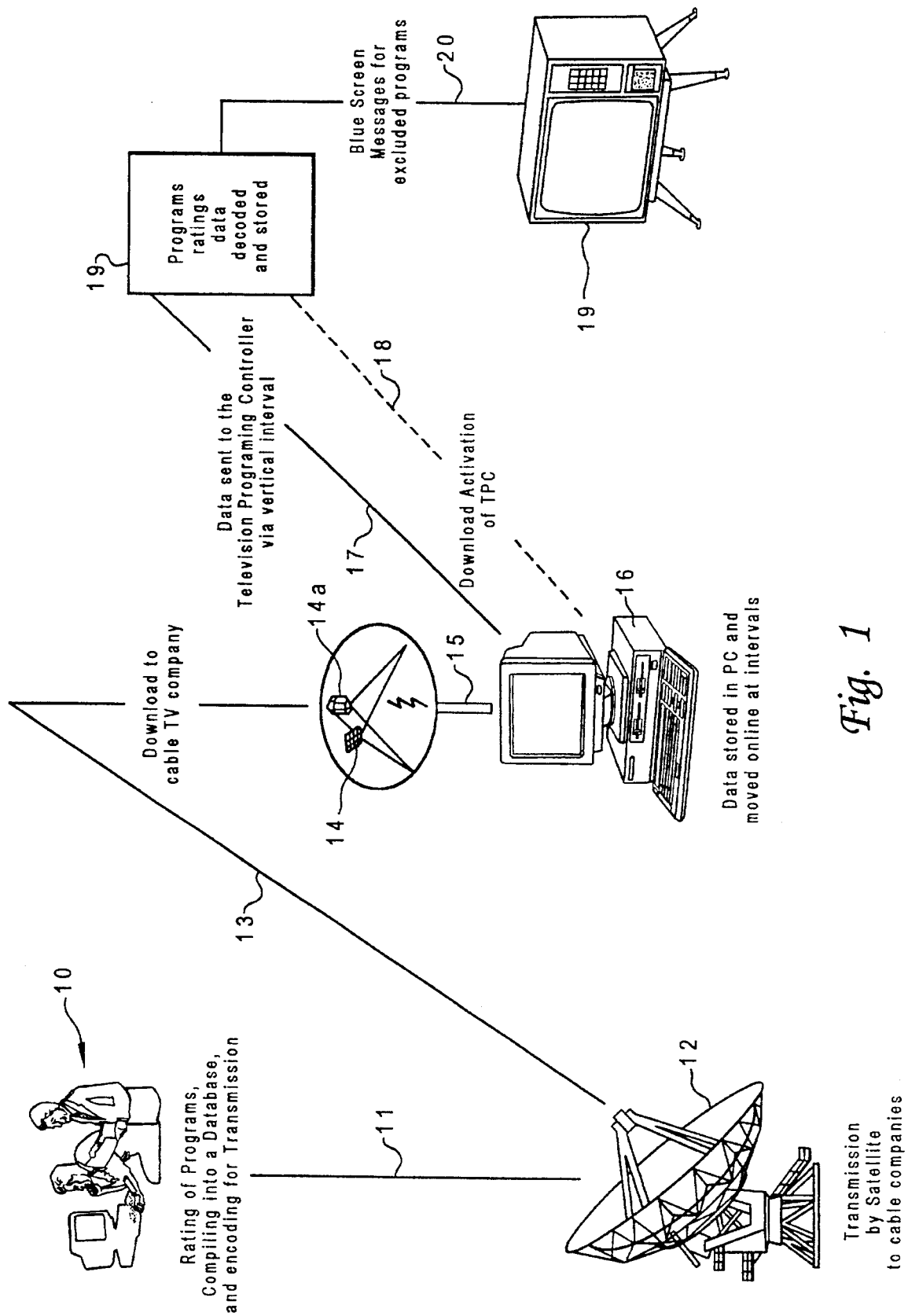
FIG. 1 is a overall view illustrating application of the principles of the invention to satellite-linked TV cable and broadcast companies.

Now turning to the drawing, and more particularly FIG. 1 thereof, it will be seen generally to depict a satellite-linked TV cable or broadcast system in which provision is made for program rating and exclusion. There, it will be seen are rating of programs, compilation of such ratings into a data base and encoding of such ratings for transmission as illustrated by numerals 10. The encoded ratings may be compiled with program schedule information and are transmitted by conventional data transfer links 1i to ground satellite transmission dish 12 and uplink 13 to one or more conventional satellites 14, 14a whence they are transmitted downwardly via conventional down link(s) 15 to a ground based receiver (not shown) and thence stored within memory in a small computer or other memory bank 16. In the preferred embodiment, program ratings are maintained current through the next succeeding period of scheduled programs. Memory updating may be accomplished at regular half hour intervals or at other convenient times, and local processing occurs to strip networks and stations that are not applicable and to insert channel assignments to the remaining network and station identifiers.

Data representative of the program rating for each program scheduled for broadcast or cable transmission may be multiplexed or otherwise configured with the program signals and transmitted from the program source to the user television set as part of the viewing signal. In the preferred embodiment, such program rating data is sandwiched into the viewing signal during frame vertical intervals and its transmission to the viewing location is represented by signal transmission link 17.

As will be described below, the system hereof includes an optional provision for each user to prepare and enter his own supplementary or alternative program rating designations; and dashed line 18 represents a signal that would activate and deactivate the censoring device so that the system may be marketed as a premium service.

The system hereof includes at or associated with each viewer location provision for program ratings data decoding and storage as represented by rectangle 19. Such storage includes, where applicable, the aforementioned optional viewer-originated rating data as well as rating data originated at 10. As will be observed from the following description, provision also is made for the use of rating data to enable or disable the associated television set (such as set 19 linked by link 20) so as to permit or prevent viewing. Moreover, although a variety of viewing screen conditions may be displayed when programs are disabled, the preferred embodiment hereof includes provision for a blue screen on which a message is displayed such as "This program has been rated a 5 by the Christian ratings system and has been turned off by the Parental Discretion Programming controller." A message is preferable to scrambling or blank screen conditions because a viewer might mistake scrambling or a blank screen condition for malfunction of the television set.

The system hereof provides a high degree of customization and flexibility. Thus, as will be observed below, provision is made for system override to: (1) Temporarily deactivate program control, permit viewing of any program by a person entering an override code and/or change a viewer PIN (identification number); (2) Enter a plurality of PIN numbers; (3) Select and activate one or more rating systems for use in controlling viewing; (4) Enter exclusion codes for proscribing individual or groups of programs; and (5) Enter individualized time allocation codes for establishing permitted times for individual viewing. Other options and alternatives will be evident as the system description proceeds.

Figure 2:
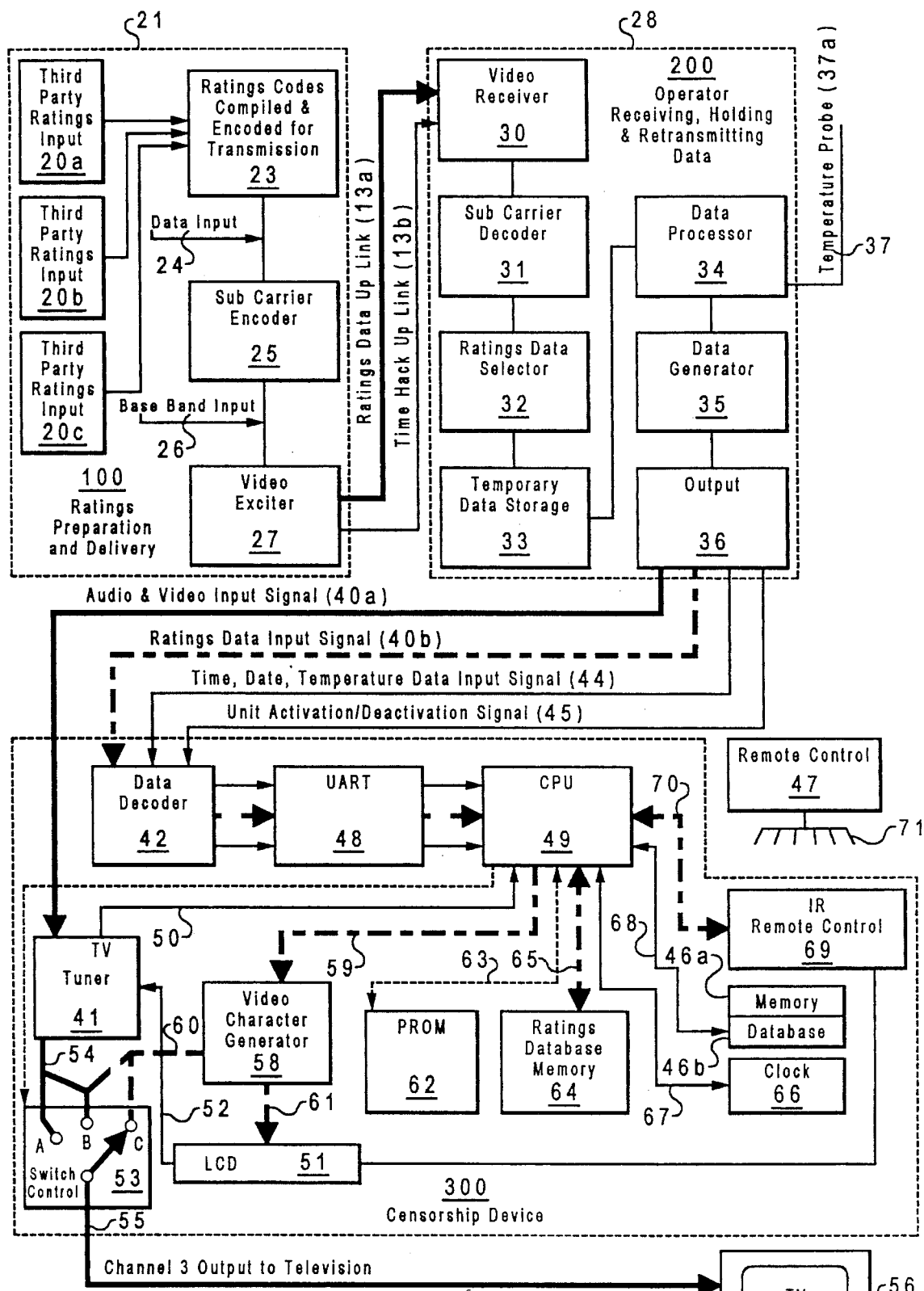
FIG. 2 is a system block diagram illustrating the Viewer Discretion Television Program Censoring System according to the invention.

Now turning to FIG. 2, an overall system in accordance with the principles hereof is depicted. There, in the module encompassed by dotted line 21 is data origination module 100 designated as "Ratings Preparation and Delivery." Included within module 100 are the aforementioned third party ratings inputs as contemplated by 20a, 20b and 20c in FIG. 2 and by representation 10 in FIG. 1. As is known to those skilled in the art, such ratings may be provided by a variety of independent authorities and may be generic, violence based, religious or otherwise. In any event, the system hereof contemplates a wide variety and large number of ratings, and module 100 is not inclusive but is merely representative of a sampling of ratings that may be employed with the system. In any event, rating categories are formally designated and data therefor are received into the system and then the rating codes are combined with TV schedule data and encoded for transmission as represented by block 23. After that, the encoded codes are augmented by any optional additional data desired to be transmitted in connection therewith as represented by legend 24 "Data Input", following which the data is processed by sub-carrier encoder 25 to produce Base Band Input 26. It is then input to Video Exciter 27 whence it is transmitted via uplink 13a (corresponding to uplink 13 in FIG. 1) to a local cable operator processing and transmitting module 200 as represented within dotted line 28 and including a legend reading."Operator Receiving, Holding & Retransmitting Data."

Within module 200 are seen video receiver 30 interconnected with sub-carrier decoder 31, ratings data selector 32, temporary data storage 33, data processor 34, data generator 35 and output 36. Also interconnected with data processor 34 is an optional temperature probe 37 as designated by temperature probe legend 37a.

Video receiver 30 and sub-carrier decoder 31 are conventional circuit modules well known in the art. Ratings data selector 32 preferably filters out of the general array of program ratings any not applicable to programs to be broadcast or transmitted by cable from the cable or television station processing and transmitting module 200. The local cable operator system inserts the channel assignment to the data file, it being this number that is the link to the TV viewer who only selects to view channel numbers. Of course, it is not essential that such filtering be performed but the exclusion of inapplicable ratings signals improves efficiency with which the system operates.

Data processing unit 34 may be any of a variety of general purpose small digital computers, and it is programmed in accordance with well known principles to correlate received ratings with the corresponding programs. After processing in unit 34, the data passes through data generator 35 where it is processed to a condition adapted for transmission through output circuits 36. It is here that the rating data may be combined (e.g., multiplexed) into the transmitted signal and appear during the vertical blanking intervals between video frames. Alternatively, data generator 35 may include an electronic chip for sending rating data on its own radio frequency. In such event the rating data may be translated at data decoder 42 into serial data for subsequent use.

After exiting from module 200, the encoded video signal is transferred from output 36 via Audio & Visual Input Signal Link 40a and Ratings Data Input Signal 40b to TV Tuner 41 and Ratings Data Decoder 42. In a cable system, such transfer preferably is accomplished via the conventional cable; in a video broadcast system, it is preferably accomplished via conventional radio frequency transmission. It should be evident to one skilled in the art also that data may be transferred from output 36 to module 300 by any of a variety of means including telephone lines, over the air radio signals, the aforementioned vertical blanking interval transmission, data generators or sideband.

Leading from Data Decoder 42 are paths to Central Processing Unit 49 through a receive node represented by Universal Asynchronous Receive Transmit circuits (UART) 48.

It will be noted in FIG. 2 that Audio & Video Input Signal Link 40a and Ratings Data Input Signal Link 40b are separately shown, the latter being represented in dashed lines. This is to illustrate that the links may be separate as well as multiplexed on the same link. However, it should be noted that a single link may be employed and that separation of the signals may be accomplished in a conventional demultiplexer (not shown) prior to introduction into TV tuner 41 and Data Decoder 42.

In order to coordinate the various parts of the system, provision is made for timing coordination. This is accomplished by transmitting a timing signal from module 100 via timing link 13b to module 200 where it is used to synchronize system components before being incorporated with other data into Time, Date, Temperature Data Input Signal that is transmitted via link 44. Also communicating between modules 200 and 300 is Unit Activation/Deactivation Signal Link 45. The foregoing data are employed to accomplish time synchronization and control of the submodules within and interconnected with censorship device module 300.

As will be observed from further reference to FIG. 2, censorship device module 300 contains a viewers data base 46b which is contained in memory 46a. Such data base is programmed using conventional techniques by a local viewing authority (such as a parent in a household) using a keypad within remote control unit 47 or directly on the device. As will be evident to those skilled in the art, such keypad may be a part of (i.e., integral with) remote control 47, attached thereto, or separate therefrom as, for example if it were to be a part of censorship device module 300. In the preferred embodiment hereof as described below, one keypad is positioned on the front of the censorship module while another is positioned on a remote control device. Both such keypads can be accessed by personal identification number holders (persons having PIN numbers) to access TV viewing and/or condition access/time programming.

In accordance with the principles hereof, the censorship device 300 is activated when connected to a source of conventional alternating current power, e.g., a wall socket in a dwelling. Thus, if the device 300 is not powered up, a TV signal will not pass therethrough and viewing cannot proceed.

Figure 3:
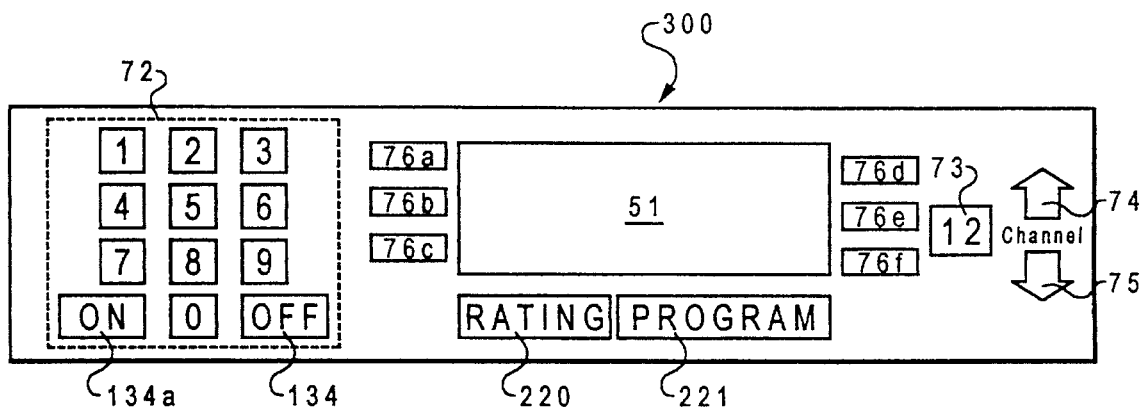
FIG. 3 is a depiction of the front of the viewer control (censorship control) device illustrating its controls and display.

It will be observed that Audio & Video input Signal 40a is input to TV Tuner 41. Therefore the screen of the television monitor 56 (TV) is dependent upon and controlled by signals communicated from CPU 49 via link 50, LCD 51 via link 52, and switch control 53 via links 54 and 55. As will be observed from further reference to FIG. 2, Video Character Generator 58 is interconnected with CPU 49, Switch Control 53 and LCD device 51 via links 59, 60 and 61. Programmable Read Only Memory (PROM) 62 is shown as being linked to CPU 49 via link 63. Ratings Database Memory 64 is interconnected with CPU 49 via link 65, module 300 clock 66 via link 67, memory/data base 46 via link. 68, and IR Remote Control 69 via link 70. Physically separate hand-held Remote Control Device 47 is shown as communicating with Control 69 via conventional infra-red transmission link 71. Some of the further details of operation will now have become evident to those skilled in the art. However, in accordance with the principles hereof, reference is now made to FIG. 3 which is seen to illustrate the operating and viewing panel of the Censorship Device Module 300. There, it will be seen is liquid crystal display (LCD) 51. Within dotted rectangle 72 there are numeric entry keys 0 through 9 and On and Off buttons which are used to turn on and off the censorship device 300. Also included are current channel indicator 73 and up/down arrow keys 74/75 which are individually activated to change channel selection in an ascending or descending direction. The remaining keys 76a–76f are User Choice entry keys used by a viewer to respond to messages displayed on LCD 51 as will be described in greater detail below.

Figure 4:
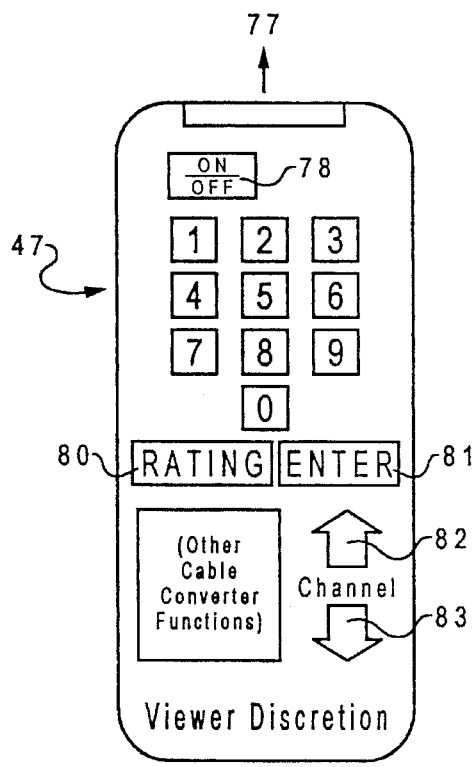
FIG. 4 is a drawing of the front of the hand-held remote control unit illustrating its controls.

It should be noted that the system hereof may be embodied in cable converters, TV's and/or VCR's; and censorship device 300 ordinarily will be located at, upon or adjacent to the viewing screen of the television monitor 56 (FIG. 2) so as to facilitate its remote control from a viewing position. In order to facilitate such remote control, the remote hand-held device 47 of FIGS. 2 and 4 is provided. The direction in which it is to be pointed in order for the aforementioned Infra-red link 71 to be functional is identified by numerals 77. It includes a toggling On-Off button 78, numeric entry keys 0–9, rating and entry keys 80 and 81, up and down arrow keys 82 and 83, and a rectangle 84 which is indicative of any other keys that conventionally are found on television viewing remote controllers.

In addition to having power to the television set 56 and the censorship device 300, it is necessary that both be turned on. This is accomplished by operation of the On-Off buttons on censorship device 300 or on remote control module 47. When set 56 and device 300 are both turned on as, for example, by pressing the "On" button either on the remote control or on the device itself, the television screen is cleared and then displays a message that states "ENTER YOUR PIN, THEN PRESS ENTER", while at the same time. the device LCD display 51 (FIG. 3) displays the message "ENTER YOUR PIN, THEN PRESS→" with the end of the arrow pointing to 76e. Once the PIN is entered, the system will display the last channel selected when the system was shut off. The programming logic then begins its circulating routines. To accomplish the foregoing, the entered PIN number is processed by the Central Processing Unit (CPU) 49 of FIG. 1, and it compares the viewer programmed censoring parameters contained in the viewer's data base 46b, with clock 66, channel setting of the tuner 41 and with the censor rated television listings in the ratings data base 64 to determine whether the audio and video signals are to be censored. If not censored, the system timing circuits are effective as described below. When the system is turned off as, for example by depressing an "Off" button, the system logs the person out and sets node 53 to C and powers off the set. However, while the system is On, if a user hits a numeric key, the system will change the channel to that number, or the user may use the channel up and down function to change the active channel.

Figure 5:
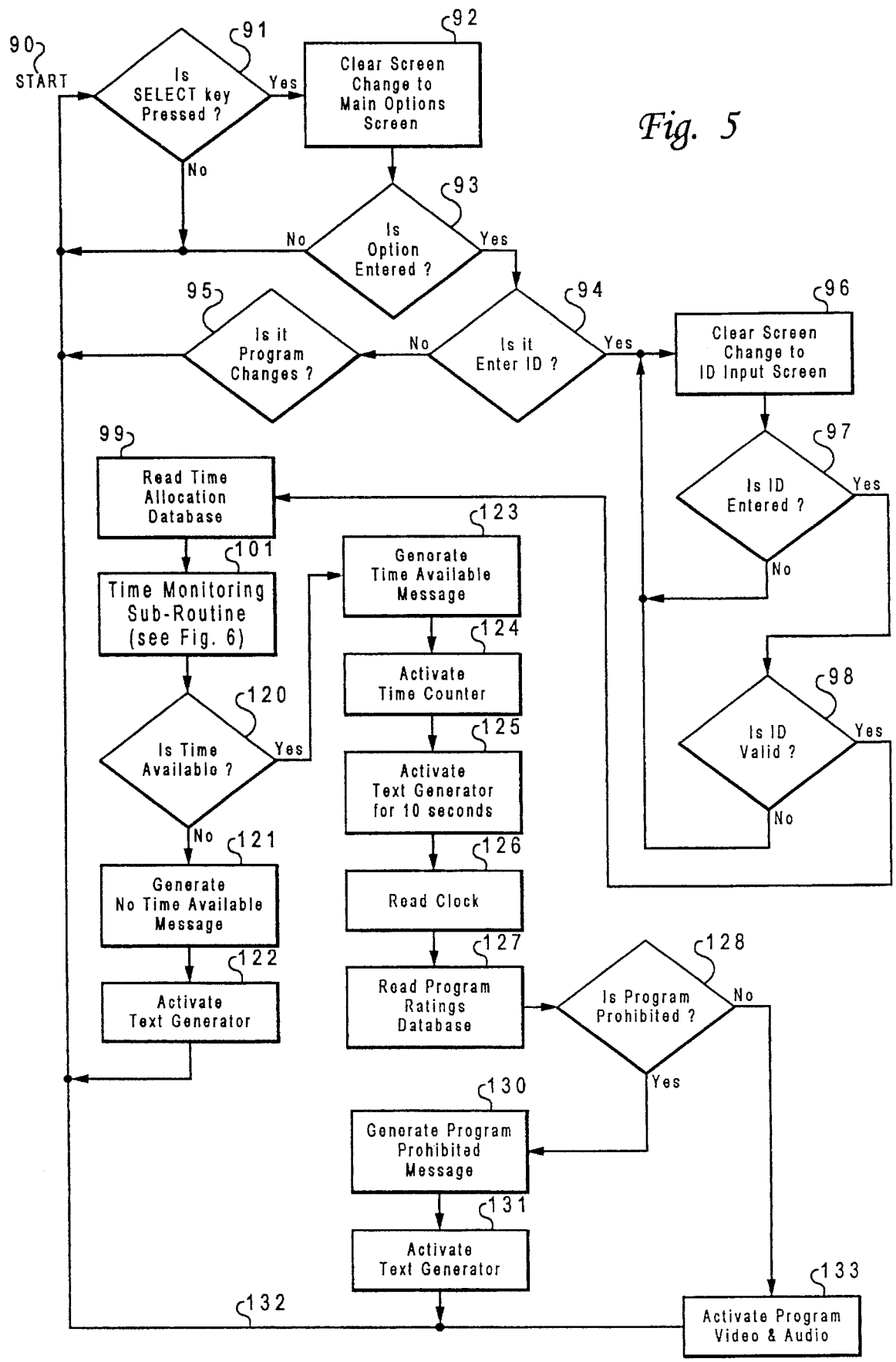
FIG. 5 is a flow diagram illustrating operation when a personal identification number (PIN) is entered into the system.
Figure 6:
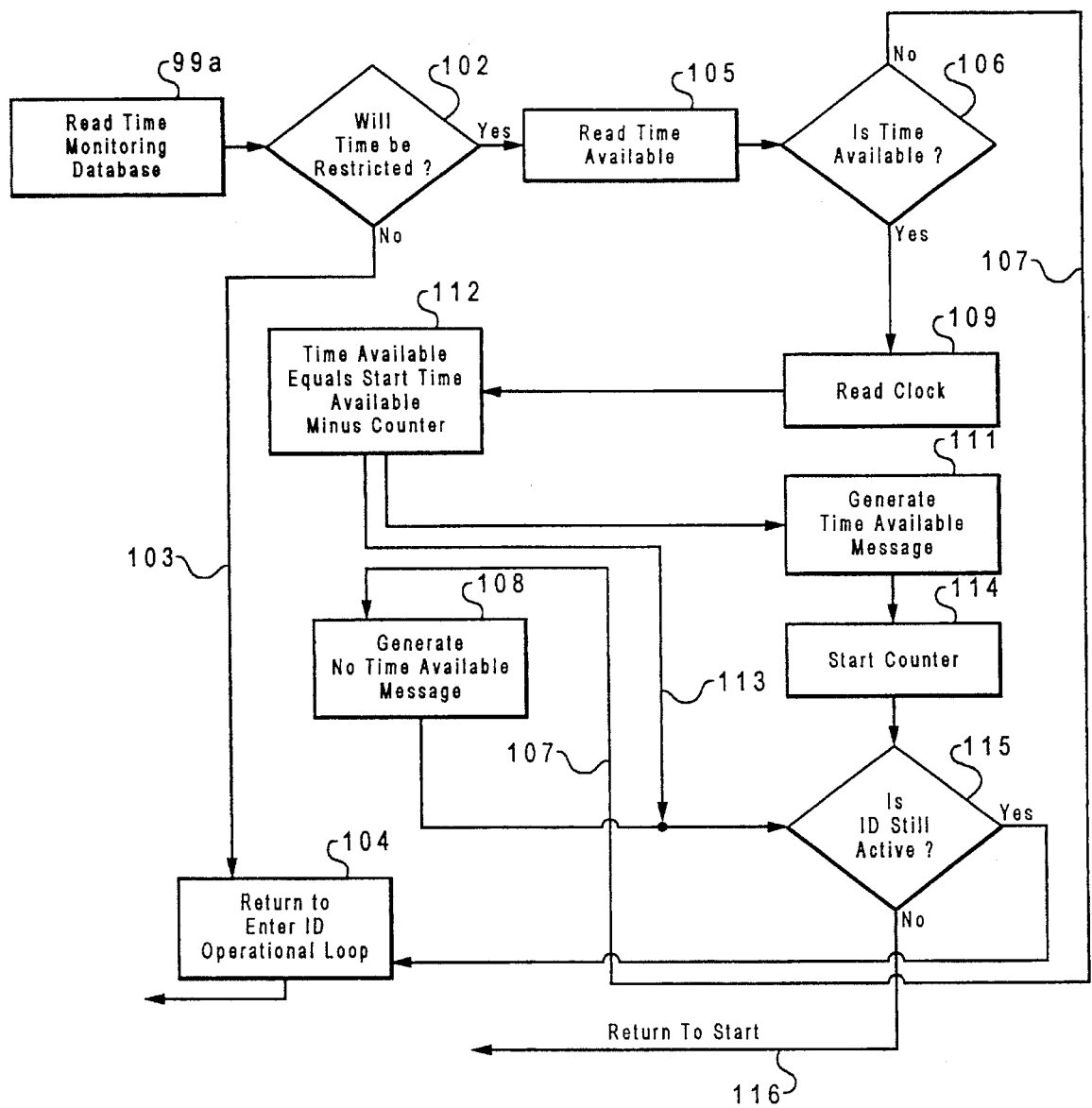
FIG. 6 is a diagram illustrating the time allocation and monitoring sub-routine.

When one of the aforementioned On buttons is depressed, the CPU 49 follows the programming loops set forth in FIGS. 5 and 6. Turning to FIG. 5, actuation of the On button is represented by start legend 90. Next, the circuits sense whether or not the select key is depressed as represented by diamond 91. If it is, the television screen is cleared as represented by legend 92 and the aforementioned available options are displayed. If not, operation of the system returns to the Start condition.

Option entries are made by depressing one or more of the User Choice entry keys 76a–f. If an option is entered as represented by diamond 93, the system determines whether the selected option is to enter the viewer's identification, e.g., PIN. This is represented by diamond 94. If the selected option is not to enter an identification number, then the system checks to ascertain whether the selected option is to change the program. This is represented by diamond 95. From this point, the system operation returns to the Start condition. However, if the selected option is to enter an identification number, then system operation proceeds to clear the old message from the screen and replace it with an input screen giving instructions regarding entry of the viewer identification (ID, i.e., PIN). This is represented by legend 96. Next, the system checks its information entry buffer to determine whether or not an identification number has been entered. This is represented by diamond 97. If an ID has been entered, the system then checks its validity. This is represented by diamond 98. If the ID is invalid, then the system returns the viewing screen to the condition represented by legend 96 so as to provide an opportunity for a viewer to enter a valid entry. On the other hand, if the entry is valid, then the system proceeds to read the amount of remaining viewing time allowed the person whose valid ID is entered. This is represented by legend 99.

It will be recalled that viewer's data base 46b includes information time that is allocated to each viewer. However, it should be understood that such time information could readily be stored elsewhere in the system if desired.

Reference is now made to the time monitoring sub-routine represented by rectangle 101 and set forth in FIG. 6. There, it will be seen is the reading of the time monitoring data base as represented by legend 99a. From there, the relevant information is checked to see if time will be restricted as represented by diamond 102. If the answer is no, then system operation proceeds as by path 103 and legend 104 whence it returns to the operational sequence as set forth in FIG. 5. If, on the other hand, the answer is yes, then the amount of permitted viewing time remaining is read, as represented by legend 105. If the required time for viewing the selected program is not available (diamond 106), then the system proceeds as by path 107 and results in the generation of a insufficient time message (legend 108). On the other hand, if sufficient time is available (i.e., remains in the viewer's allocation), then system clock 66 is read (legend 109). The system then proceeds to generate a message setting forth the amount of time available (legend 111) and then starts counter 114 so as to measure subsequent time used.

Diamond 115 represents system identification of whether or not the entered ID is still active. As would be expected from viewing FIG. 6, if no remaining time is authorized for the viewer whose ID is then active, the system returns its operation as represented by path 116 to start position 90 of FIG. 5. On the other hand, if adequate time for viewing the selected program is still available, the system returns (as represented by legend 104, FIG. 6) to resume further operations at the point of entry to diamond 120.

If none or insufficient viewing time remains, the system proceeds to re-position the switch 53 to the "C" position, generate a time insufficiency message (legend 121) and activate text generator 122 to display the message on LCD display 51. On the other hand, if there is sufficient viewing time remaining, the system proceeds to generate a time available message 123, activate time counter 124, activate text generator 125 for about 10 seconds, read the system clock 66 as represented by legend 126 and then read program ratings data base 64 as represented by legend 127.

After reading program ratings data base 64, the system proceeds to compare the rating of the selected program with the authorized ratings as included in viewer data base 46b (diamond 128). If the rating of the proposed channel selection does not fall within those for which viewing is permitted, then the system proceeds to the generation of a program prohibited message (legends 130 and 131) and return via path 132 to start condition 90. However, if viewing is permitted, then the system proceeds to enable program video and audio as represented by legend 133.

Once the foregoing sequence of operations is begun, it continuously recycles the timing and ratings sub-sequences of operations as set forth above so as to ensure that any change of channels during viewing will be subject to censorship and timing.

In sequencing through the steps described above, if the CPU 49 finds time restrictions listed in the viewers data base 46b as represented by legend 99 (FIG. 5), the time monitoring sub-routine 101 is then followed as described above in connection with FIG. 6. At the time of video signal activation, the CPU will signal switch control 53 to connect to switch C, the video character generator 58 and will send a message to the LCD 51 informing the viewer of how much viewing time he/she has available. If no viewing time is available, switch control 53 will be set to position B so that the message will also be sent to the television screen. The no time available message will remain on the screen until a new PIN is entered or the "OFF" button 134 (FIG. 3) is depressed.

If the viewer has time available, the CPU 49 then checks to see if there are viewer restrictions on program content. As mentioned above, such restrictions also are stored in viewer data base 46b; and if such restrictions are found, then system will continue to follow the sequence of operations in FIG. 5. The CPU 49 checks to see what channel the tuner 41 is set on, reads clock 66 and the viewer restrictions table in memory 46b, and checks ratings data base 64 to see if the current program is prohibited. If the program is prohibited, the CPU will signal the switch control 55 to set to the video character generator 58 and will generate a message for the TV screen stating that the selected program is being restricted by the censorship device. As mentioned above, because the operational loop is constantly in operation, whenever the viewer changes channels, any needed censorship actions automatically occur.

In the preferred embodiment, provision is made for system acceptance of as many as 10 personal identification numbers (PINs). However, the system is readily expandable to accept up to 99 different identification numbers.

Figure 7:
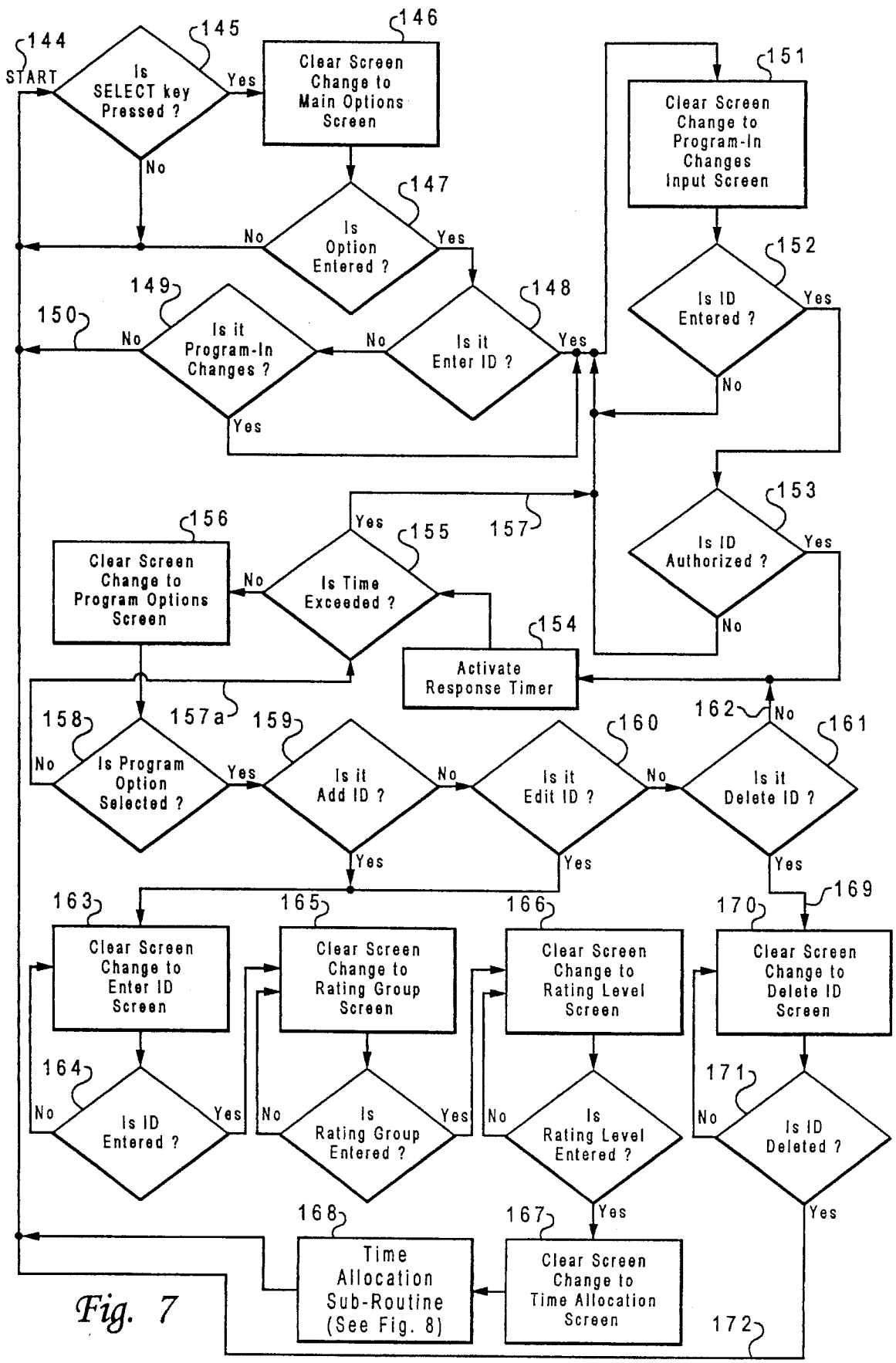
FIG. 7 is a diagram illustrating operation when a user programs censoring (control) data and enters it into the system.

As mentioned above, provision is made for programming allowable timing and user-established ratings into the system where they are stored in viewer data base memory 46b (FIG. 2). Any of a variety of well-known programming techniques may be employed. However in accordance with the preferred embodiment hereof, it is accomplished as illustrated in FIGS. 7 and using the controls on censorship module 300 (FIG. 3) or on the remote hand-held control module 47 (FIG. 4). Thus, depressing program key 221 results in the displaying of a message on display 51 asking for entry of the Master PIN Number. The Master PIN number is a number that permits the local censorship authority (ordinarily the head of household) to change censorship and time settings for the local system. The system also contemplates the provision of a secondary hidden Master PIN which may be used if the primary one is forgotten. Either or both of these master numbers may be changed by the person having the then-current Master PIN number. In the event the local censorship authority needs to retrieve the Master PIN number, he/she may contact the local television cable company where a master record will be retained.

FIG. 7 illustrates the preferred programming sequences for programming the system to perform as described above. There, the time programming sequence is initiated by the local control authority such as the head of the local household. After starting the programming sequence by pressing the program key 221 so that the logic path at diamond 145 is yes, the viewing screen of the LCD display 51 is cleared and changed to display the Main Operations text which lists options available to the local control authority and which is represented by legend 146. Once an option is entered (diamond 147), the sequence progresses to check if the entry is to enter an identification number (diamond 148). If the answer is yes, then the system proceeds to step 151. If the answer is no, then the system proceeds to check whether the entry option relates to programming one or more changes in to the system (diamond 149). If the answer is no, the system returns as by path 150 to start 144: if yes, it proceeds to clear the display and substitute a program changes input option screen as represented by legend. The system then checks for an ID entry (diamond 152) until an entry is recognized, after which the system checks to make sure the entered ID is authorized to make programming changes (diamond 153). If not authorized, the system returns to the condition represented by legend 151: if authorized, the system progresses to activate response timer 154. If timed out, system operation returns to input screen 151 as by path 157. If not timed-out, the system progresses through timing diamond 155 to clear screen and change to program options screen (legend 156).

Next, the system checks to see whether a program option is the selection (diamond 158). It then checks if the selection is to add an ID (diamond 159). If no, it then checks if the selection is to edit an existing ID (diamond 160) and, if no, checks if it is to delete an existing ID (diamond 161). If the answer is still no, system operation returns as by path 162 to reactivate response timer 154.

Figure 8:
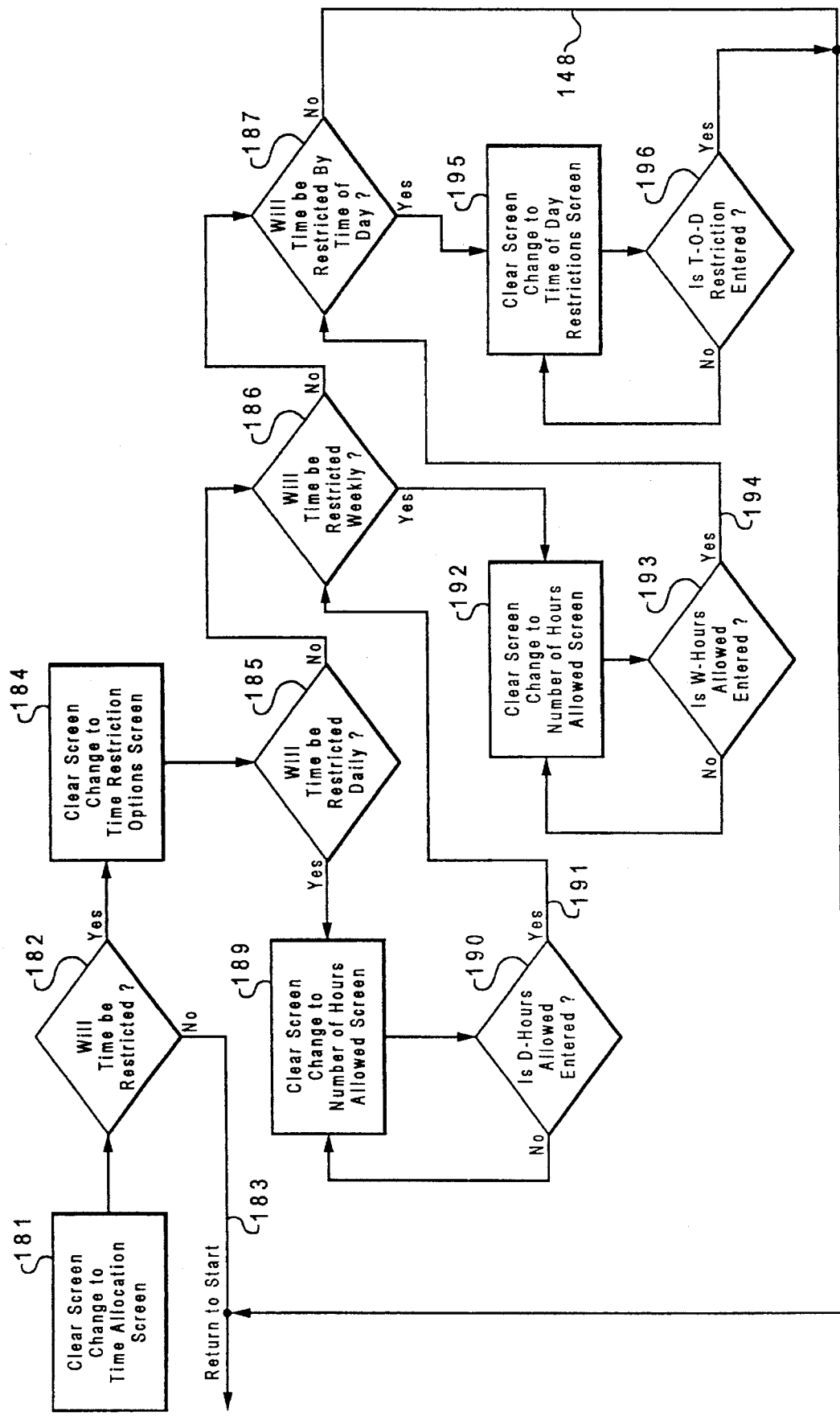
FIG. 8 is a diagram illustrating the programming logic of the time allocation and monitoring sub-routine.

If the response at either 159 or 160 is yes, then the system proceeds clear the screen and change its display to an enter ID prompt (legend 163) after which it checks to see if ID entry information has been entered (diamond 164). After the entry information has been entered, the display is changed to a Rating Group Screen (legend 165) with prompts for Rating Group entry or modification. When entry or modification is completed, the system clears the screen and displays a Rating Level Screen (legend 166): and once Rating Level information is entered, it clears that screen and displays a Time Allocation screen (legend 167). At that point, the system proceeds to follow a sequence of operations as described below in connection with FIG. 8 (rectangle 168).

If the answers as at diamonds 159 and 160 is no, but the answer as at diamond 161 is yes, then system sequence proceeds as via path 169 to clear the screen and change it to a Delete ID screen option display (legend 170). After deletion, the system recognizes the deletion by answering yes at diamond 171, whereupon operation returns as illustrated by path 172 to start condition 144. If allowable time is exceeded (diamond 155), logic path 157 is followed to clear the screen as indicated by legend 151.

As mentioned above, FIG. 8 illustrates the preferred sub-routine for programming viewer time allocation. When programming of the system (FIG. 7) proceeds to the point represented by rectangle 168 "Time Allocation Sub-Routine", it then proceeds as set forth in FIG. 8. The first step is the clearing the television monitor 56 and/or LCD display 51 and the display of time allocation options. This is represented by legend 181. Next, there appears on the display the question "Will Time Be Restricted" (diamond 182) coupled with a listing of identification numbers (PINs) have been assigned. If the answer is no, then the system returns to a start condition as represented by path 183. If, on the other hand, time is to be restricted for any viewer, then the display screen is changed to present time restriction options as represented by legend 184. The system checks if time will be restricted daily (diamond 185) and if no, it proceeds to ask if time will be restricted on a weekly basis (diamond 186). If the answer is no, then it proceeds to ask if time will be restricted by time of day (diamond 187), and if the answer is no, then the system returns to the start condition as represented by path 188.

If the answer to daily restriction (diamond 185) is yes, then the viewing screen is changed to prompt an entry for the number of permissible hours (legend 189), retaining its display as represented by legend 189 until the system identifies an entry of the permissible number as reflected by diamond 190. Then, the system proceeds as represented by path 191 to inquire if time will be restricted weekly (diamond 186). If time is to be restricted weekly, then system operation proceeds to clearing of the existing viewing screen and its replacement with prompts for the number of allowable weekly hours as represented by legend 192. System operation then awaits entry of an allowable weekly number as represented by diamond 193 after which it proceeds as represented by path 194 to inquire if time will be restricted according to the time of day (diamond 187). If the answer is yes, then system operation proceeds to a clearing of the existing viewing screen and its replacement with prompts for the times of day when viewing is either prohibited or permitted as represented by legend 195, the programming input system again remaining in a waiting condition until any time of day restrictions are entered as represented by diamond 196, after which the system is returned to its start condition as represented by path 188.

The programming entries of the preceding paragraphs may be made by depressing the appropriate numerical keys on the face of the censorship device 300 (FIGS. 3, 9, 11 and 12) or the viewer discretion remote control 47 (FIG. 4). Thus, for example, buttons 76a–76f may be selectively depressed in response to questions asked on the display in order to enter the indicated information. Alternatively, combinations of arithmetic buttons may be depressed either on module 300 or remote control module 47 as directed by screen prompts.

It should be emphasized at this point that the system includes in the local programming routines mentioned above, provision for entry of an exceptions list into the data base 46b. This makes it possible for the local control authority (e.g., parents) to modify or override program ratings received from the central program rating/encoding source 10 (FIG. 1). Thus, when parents discover a television program that in their view has either not been rated or has been mistakenly rated, they may block that program by blocking the related channel from viewing during specified times (e.g., time and day of the week) for a particular duration. This is accomplished by manipulation of the keys on hand-held module 47 or censorship control module 300. Exceptions data is thus entered into the exceptions list in data base 46b, and such exceptions data is given priority over corresponding data that may have been received from the central rating/encoding source. Alternatively, the local authority (e.g., parents) may enter data to eliminate censorship from one or more programs, thus enabling their viewing by members of the family. In this way, complete viewing control ultimately is vested in the local control authority.

Figure 9:
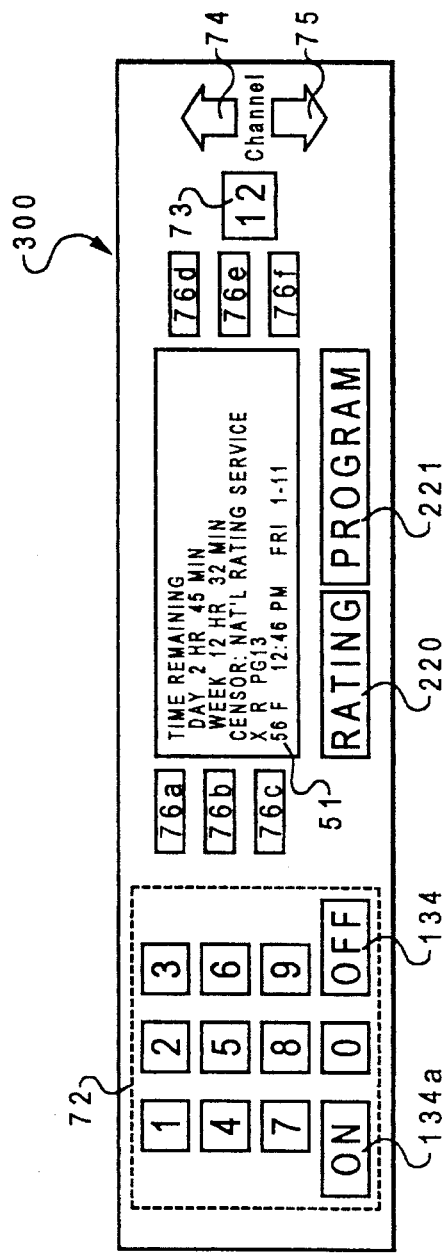
FIG. 9 is a front view of a local viewing control (censorship) module according to the invention.

FIG. 9 illustrates the front panel of censorship device module 300. When a an identification such as a personal identification number (PIN) is entered, the LCD device 51 preferably displays six lines of information as follows:

Line 1: shows the legend "Time Remaining"

Line 2: displays the amount of time remaining that day

Line 3: displays the amount of time remaining during the current week

Line 4: displays an identification of the rating authority

Line 5: shows which segments are being censored

Line 6: displays current temperature, time, day and date

Figure 10:
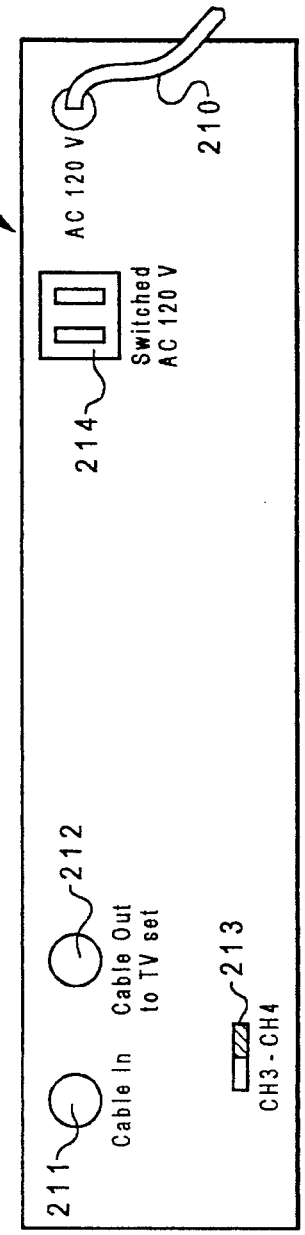
FIG. 10 is a rear view of the module of FIG. 9.

While the foregoing preferably are displayed, it will be evident to one skilled in the art that other or additional items of information could readily be displayed. For example, in addition to outdoor temperature at a cable company facility, many other types of information could readily be displayed such as, but not limited to, stock listings or sport scores FIG. 10 depicts the rear of the censorship control module 300. There, it will be seen, are conventional a-c power cord 210, F-type locking coaxial cable in and out connectors 211 and 212, channel switch 213, and source of switched a-c power 214, the latter being included so as to provide for the turning on of one or more other system components (e.g., the TV set) when On button 134a is depressed to activate the censorship module. Locked type connectors 211 and 212 are provided so as to prevent circumvention of the device by changing connections thereto.

Figure 11:
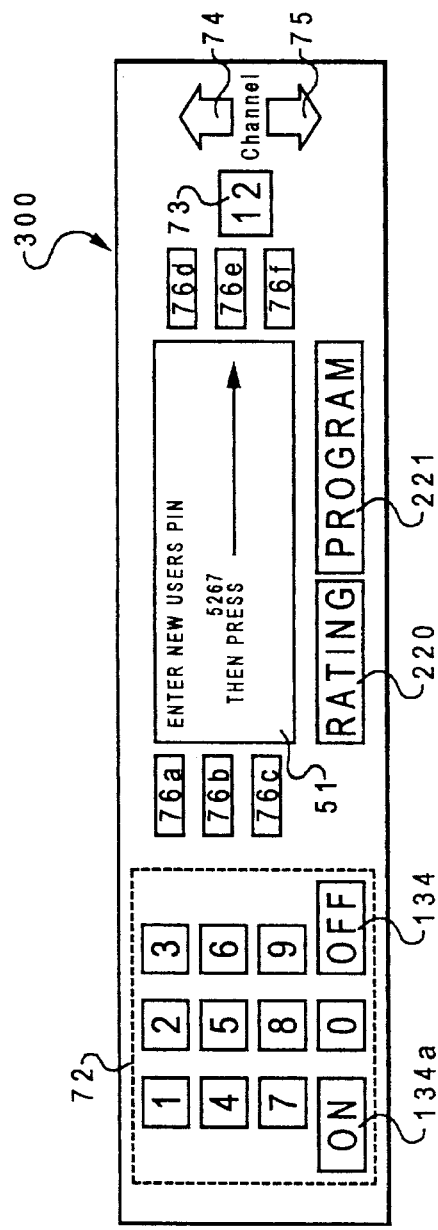
FIG. 11 is view illustrating the front of the censorship control module of FIG. 9 depicting an LCD message during programming of a new personal identification number.

FIG. 11 illustrates the front panel of censorship device module 300 when in a typical stage of the programming mode as described above in connection with FIGS. 7 and 8. There, it will be observed, is a prompt "Enter New Users PIN" followed by PIN number 5267 that has been entered by the local controlling authority. Also shown is a prompt that is displayed after a new PIN has been entered. That prompt instructs the person making the entry to press key 76e after a correct new PIN has been entered. Using prompts and key identification, programming and changes in programming is facilitated and easy to follow.

Figure 12:
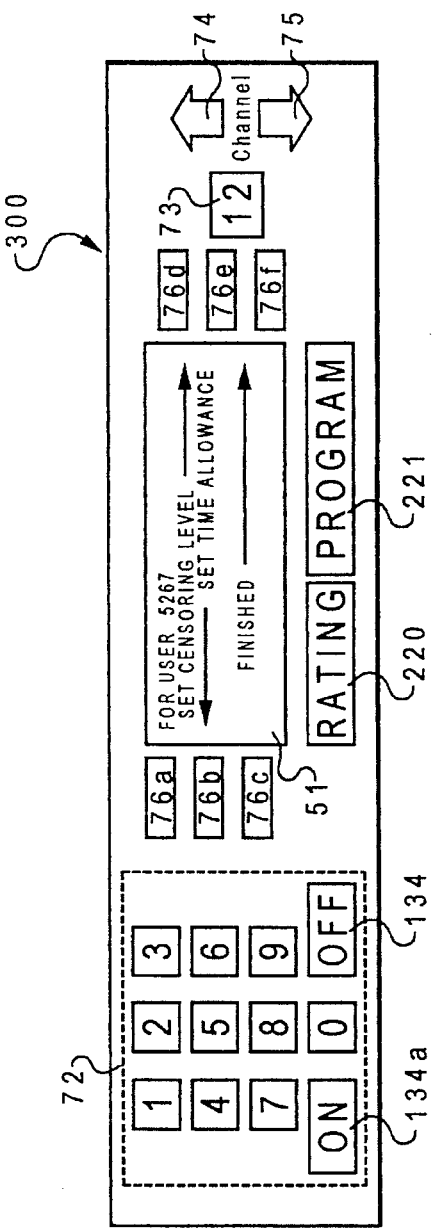
FIG. 12 is a view illustrating the censorship control module of FIGS. 9 and 11 when depicting an LCD message displayed as a user programs additional control parameters.

FIG. 12 illustrates the front panel of censorship device module 300 when in another of the above stages within the programming mode as described above. Here, censorship criteria are being entered for the person whose PIN number is 5267. Arrows point to key 76d for setting the desired censoring level, 76b for setting the time allowance, and 76f for depression when the programming sequence is completed.

in addition to the foregoing, yet another feature is included in the system hereof. When Rating Button 220 on censorship module 300 or Rating Button 80 on the hand held module 47 is depressed, there appears on the LCD display and the television screen a message giving the censor rating of the show currently being viewed, together with the name of the Rating Authority that assigned the rating. Thus, when either of these rating buttons is actuated, the CPU 49 (FIG. 2) sends instructions to video character generator 58 to generate the message while instructing switch 53 to assume the B position thus superimposing the information over the normal video picture then being displayed. It will, of course, be evident that other information also could be displayed as, for example, to display the name or title of the program, its type (e.g., a movie, a series, a news program or a special). In such event, it is contemplated that relevant data would be stored along with the program ratings in the Ratings Data Base 64 of FIG. 2.

Among the many features of the system hereof is its versatility. Thus, as mentioned above, the system has the flexibility of displaying any of a number of desired parameters such as the current temperature to which reference is made above. In addition to its being displayed on the display of FIG. 9, it could also be displayed either by itself or together with other display content on the screen of the TV monitor.

It will now be evident to those skilled in the art that there has been described herein an improved television viewing control system.

Although the invention hereof has been described by way of example of preferred embodiments, it will be evident that other adaptations and modifications can be employed without departing from the spirit and scope thereof. For example, one censorship control module could be provided employed with multiple television sets or monitors.

The terms and expressions employed herein have been used as terms of description and not of limitation; and thus, there is no intent of excluding equivalents, but on the contrary it intended to cover any and all equivalents that may be employed without departing from the spirit and scope of the invention.

What is claimed is:

1. A viewer discretion program censoring system comprising:
   (a) a visual display;
   (b) a source of programs for viewing by a viewer on said visual display;
   (c) viewer control means conditionable by a first viewing authority for:
      (1) identifying content of said selectable programs,
      (2) allocating permissible viewing times for a viewer; and
   (d) display control means interconnected with said visual display and responsive to said viewer control means for enabling and disabling said visual display according to content selected by said authority.

2. A viewer discretion program according to claim 1 in which said first viewing authority is a person.

3. A viewer discretion program according to claim 2 in which said person is a designated member of a household.

4. A viewer discretion program according to claim 1 in which said first viewing authority is a program rating committee.

5. A viewer discretion program according to claim 1 in which said first viewing authority is selectable from a plurality of program rating committees.

6. A viewer discretion program according to claim 4 in which program ratings of said program rating committee are established in levels according to program content.

7. A viewer discretion program according to claim 1 wherein said source of programs originates at a national level and wherein said programs are listed according to a national listing of network and station programming schedules, further including local cable operator means, and means conditionable by said local cable operator means for inserting channel assignments to said national listing.

8. A viewer discretion program according to claim 4 further including means for transmitting program ratings prepared by said program rating committee to said viewer control means.

9. A viewer discretion program according to claim 4 further including means for automatically transmitting program ratings prepared by said program rating committee to said viewer control means.

10. A viewer discretion program according to claim 8 further including means for overriding said program ratings prepared by said program rating committee.

11. A viewer discretion program according to claim 1 in which content of said selectable programs is grouped according to categories.

12. A viewer discretion program according to claim 11 in which said categories are established according to moral standards.

13. A viewer discretion program according to claim 1 in which said permissible viewing times include specific times of day.

14. A viewer discretion program according to claim 1 in which said permissible viewing times include total cumulative times during predetermined calendar periods.

15. A viewer discretion program according to claim 13 in which said permissible viewing times include total cumulative times during predetermined calendar periods.

16. A viewer discretion program according to claim 15 in which said predetermined calendar periods are individual days.

17. A viewer discretion program according to claim 15 in which said predetermined calendar periods are individual weeks.

18. A viewer discretion program censoring system according to claim 1 including:
   (a) a plurality of viewers; and
   (b) means including said first viewing authority for assigning each of said plurality of viewers a censoring system personal identification number.

19. A viewer discretion program censoring system comprising:

(a) a visual display;

(b) a source of programs for viewing by a plurality of viewers on said visual display;

(c) viewer control means conditionable by a first viewing authority for:
  (1) identifying content of said selectable programs according to categories,
  (2) allocating permissible viewing times for each of said viewers; and
  (3) allocating to each of said viewers a system personal identification number for selectively identifying each of said viewers to said system;

(d) display control means interconnected with said visual display and responsive to said viewer control means for:
  (i) enabling and disabling said visual display according to content selected by said authority;
  (2) enabling and disabling said visual display according to times of day selected by said authority; and
  (3) disabling said visual display according to total elapsed individual watching time during predetermined watching periods.

20. A viewer discretion program censoring system according to claim 19 including means for selectively designating to each viewer individualized program censoring and times for watching.

21. A viewer discretion program censoring system according to claim 19 wherein said source of programs includes a cable TV operator, and means actuable by said cable TV operator for activating or deactivating said viewer discretion program censoring system.

22. A viewer discretion program censoring system according to claim 21 in which data representing said programs is configurable by said cable TV operator and in which said system includes means responsive to said data for displaying said programs.

23. A viewer discretion program censoring system according to claim 19 including means for operably coordinating said system with TVs, VCRs, cable converters, TV controllers and stand-alone systems.

24. A method of selectively controlling household television viewing comprising steps of:
  (a) assigning a personal identification to each selected household member of television watching age;
  (b) selectively assigning program ratings to each of a plurality of television programs;
  (c) assigning to each household member authorization for viewing programs having selected program ratings; and
  (d) assigning to each household member authorization for times of program watching.

25. The method of claim 24 further including a step of providing for manual override by a household viewing authority of said member authorization for viewing programs.

26. The method of claim 24 wherein assigning a personal identification to each selected household member of television watching age comprises a step of selectively assigning personal identification numbers.

27. The method of claim 24 wherein the step of assigning program ratings comprises establishing said ratings in categories according to personal criteria values including generic, profanity, violence, sexual or religious content.

* * * * *